Nov. 11, 1969 J. A. AMICK 3,477,872

METHOD OF DEPOSITING REFRACTORY METALS

Filed Sept. 21, 1966 2 Sheets-Sheet 1

Inventor:
JAMES A. AMICK

By W. S. Hill
Agent

Inventor:
JAMES A. AMICK
By W. S. Hill
Agent

United States Patent Office 3,477,872

Patented Nov. 11, 1969

3,477,872
METHOD OF DEPOSITING REFRACTORY METALS

James A. Amick, Princeton, N.J., assignor to RCA Corporation, a corporation of Delaware Filed Sept. 21, 1966, Ser. No. 580,933
Int. Cl. C23c *13/02;* C03c *21/00;* B44d *1/18*
U.S. Cl. 117—212 4 Claims

ABSTRACT OF THE DISCLOSURE

A method of depositing a refractory metal on a semiconductor substrate oxide coating, comprising etching the oxide coating with the metallic hexafluoride, and then depositing the refractory metal on the oxide coating by reduction of the hexafluoride.

The present invention relates to an improved method of depositing a refractory metal on certain substrates and, more particularly, to an improved method of depositing tungsten on a substrate which comprises silicon dioxide.

Microcircuits of the silicon monolithic type include a substrate body or layer of single crystal silicon with active and passive circuit components fabricated in and on the substrate. Such circuits are also usually provided with a surface protective and insulating layer of silicon dioxide. Interconnections between components comprise strips of a suitable metal which has been deposited on the insulating layer.

In the past, aluminum has been generally used for making the circuit interconnections in silicon monolithic circuits. Aluminum is readily evaporated in vacuum, has a high electrical conductivity, and adheres well to both silicon and silicon dioxide. However, it has now been found desirable to incorporate processing steps in some silicon monolithic circuits subsequent to metallization which involve use of relatively high temperatures. Aluminum has been found to be unsatisfactory as an interconnection metal under these circumstances since it alloys with silicon at about 575° C.

It has also been found that tungsten or molybdenum have characteristics which would make them desirable to use as interconnection metals in microcircuits where high processing temperatures are used. Tungsten, for example, is a refractory metal which does not alloy with silicon below about 1350° C. It also has a temperature coefficient of expansion which is an excellent match for that of silicon. Moreover, it is hard and not easily abraded, therefore it is resistant to handling damage during circuit fabrication.

But, when tungsten was tried as the interconnection metal in microcircuits having silicon dioxide protective layers, adherence to the oxide was found to be unsatisfactory. The tungsten tended to peel off the substrate in spots, causing circuit failure.

An object of the present invention is to provide an improved method of depositing an adherent layer of tungsten or molybdenum on a silicon dioxide surface.

Another object of the invention is to provide an improved silicon monolithic microcircuit in which circuit component interconnections are of tungsten or molybdenum.

Briefly, the present invention comprises pretreating a silicon dioxide surface upon which a refractory metal, such as tungsten or molybdenum is to be deposited from the vapor phase, with tungsten or molybdenum hexafluoride vapor, for a brief period, and then depositing tungsten or molybednum respectively on the treated surface. At the same time as the silicon dioxide surface is being treated with the hexafluoride, tungsten or molybdenum may be deposited through openings. in the oxide on selected areas of a silicon substrate. Treatment of the silicon dioxide surface with the hexafluoride etches the oxide surface and modifies its properties such that a refractory metal layer adheres much better than it does without such treatment.

A specific example of the method of the present invention will now be given with reference to the drawing, of which FIGURE 1 is a section view of a semiconductor chip with circuit components already fabricated therein and provided with an oxide protective layer on which tungsten is to be deposited in accordance with the method of the invention;

FIGURE 3 is a schematic diagram, partly in section, of apparatus that can be used in carrying out the method of the present invention;

EXAMPLE

Figure 1:
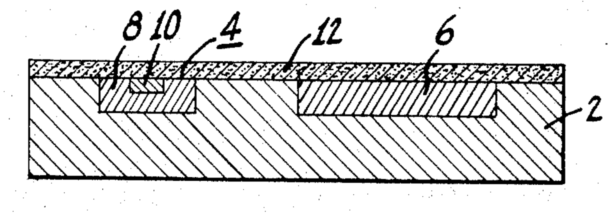

A specific example will now be given of how the method of the present invention can be utilized in making a microcircuit of the silicon monolithic type, but it will be understood that this is by way of example only and that the method is not limited to the manufacture of any particular product. As shown in FIGURE 1, the microcircuit being fabricated comprises a single crystal chip of semiconducting silicon 2 having a transistor 4 and a diffused resistor 6 fabricated therein. The transistor 4 includes a base region 8 and an emitter region 10 made by diffusing suitable impurities into one surface of the chip 2. The transistor 4 also includes a collector region which is part of the chip 2 outside the base region 8. The resistor 6 is also made by diffusing suitable impurities into the chip 2. The entire surface of the chip 2, into which the circuit components 4 and 6 are fabricated, is covered with a silicon dioxide layer 12 which protects the PN junctions exposed at the surface of the silicon chip and also serves as an insulating substrate for carrying metal interconnections.

Figure 2:
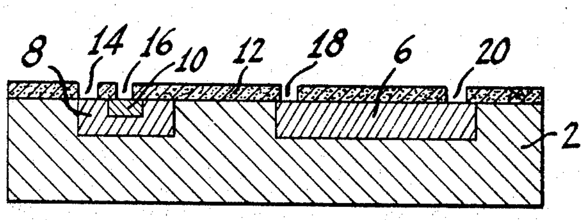
FIGURE 2 is a view like that of FIGURE 1 showing a further step which may precede the carrying out of the present method.

The circuit components are to be interconnected with conductors made of tungsten. In order that interconnecting conductors can make contact with the circuit components, as shown in FIGURE 2, suitable openings are made in the silicon dioxide layer 12 by conventional photoresist masking and etching techniques. By these techniquese an opening 14 in the layer 12 exposes a part of the base region 8 and an opening 16 exposes part of the emitter region 10. Similar openings 18 and 20 are provided to expose portions of the opposite ends of the resistor 6.

In order to carry out the processing steps of the present method, the assembly, as shown in FIGURE 2, is placed within a quartz furnace tube 22 which is a part of apparatus shown in FIGURE 3. The assembly is supported on the top of a susceptor block 24 made of carbon coated with silicon carbide. The susceptor block rests on a tilted quartz support 26. The interior of the carbon block contains a thermocouple 28 connected by wires 29 to a radio frequency generator, not shown. The furnace tube 22 is provided with an inlet tube 30 and a flow meter 32 which measures the flow rate of the incoming gases. The furnace tube is also provided with an outlet tube 34 so that exhaust gases may be passed off to a fume hood or other disposal means, not shown. A gas manifold 35 is connected to the flow meter 32 which measures the incoming flow of gas to the furnace tube 22. Connected to the manifold 35 is a flow meter 36 and an inlet tube 38 provided with suitable valves for admitting measured quantity of argon to the system. Also connected to the gas manifold 35 is another flow meter 40 and an inlet tube 42, provided with suitable valves, for admitting hydrogen gas into the system. Included in the hydrogen inlet line is a palladium diffuser 44, which serves to purify the hydrogen gas. Also connected to the manifold 35 is a third flow meter 46 and an inlet tube 48 for admitting tungsten hexafluoride into the system. The gas inlet tube 48 is provided with branch tube 50 which has a valve for admitting argon into the line for purging purposes.

Before introducing the microcircuit chip into the furnace tube, the silicon dioxide surface may first be suitably cleaned, e.g., by rinsing in trichloroethylene. This step is not absolutely necessary and may be omitted if the silicon dioxide surface is already sufficiently clean.

After the microcircuit which is to be treated is placed within the furnace tube, the tube is closed off and then heated by means of an RF induction coil 52 from the RF generator previously mentioned but not shown, to a temperature of about 500° C. to 800° C. (preferably at about 600° C.). Meanwhile, argon is admitted through the inlet tube 38 and the flow meter 36 so that it passes through the manifold 35, the flow meter 32 and the inlet tube 30, to enter the furnace tube 22 at a rate of about 4000 cc. per minute.

Tungsten hexafluoride in gaseous form is then admitted through the inlet tube 48 and the flow meter 46 to join the argon stream in the manifold 35 and pass into the furnace tube at a rate of about 30 cc. per minute.

Figure 4:
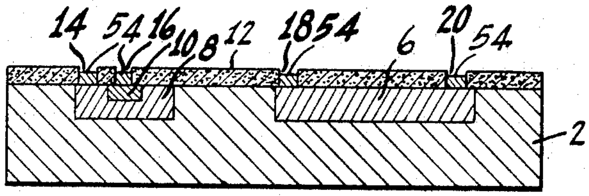
FIGURE 4 is a view like that of FIGURES 1 and 2 illustrating a first step in carrying out the present method.

As the mixture of argon and tungsten hexafluoride passes over the microcircuit assembly, silicon, which is exposed at the bottoms of the openings 14, 16, 18 and 20 in the silicon dioxide layer 12, reacts with the tungsten hexafluoride, and, by a replacement reaction, a thin layer of tungsten 54 is deposited on the silicon (FIGURE 4). At the same time, tungsten hexafluoride gas etches the surface of the silicon dioxide layer 12 and roughens it slightly. The present stage of treatment is permitted to continue for about 1 minute, although the treatment may be varied from a few seconds in duration to several minutes, depending upon the amount of etching desired.

If the treating time with tungstetn hexafluoride is about a minute, a layer of tungsten about 1000 to 1200 A. in thickness will build up on the silicon.

At the conclusion of the etching and partial deposition step, the tungsten hexafluoride flow is terminated and the tungsten hexafluoride is purged from the apparatus by permitting argon to continue flowing into the system at a rate of about 4000 cc. per minute, for a time sufficient to sweep all the unreacted hexafluoride out of the furnace tube.

Figure 5:
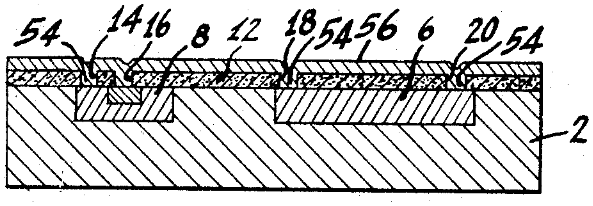
FIGURE 5 is a view like that of FIGURES 1, 2 and 4 illustrating a second step in carrying out the present method.
Figure 6:
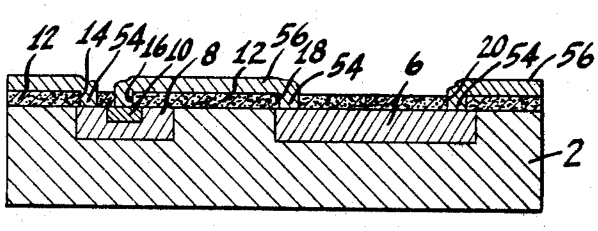
FIGURE 6 is a view like that of the preceding figure showing a further processing step that may be used in making a microcircuit.
Figure 2:
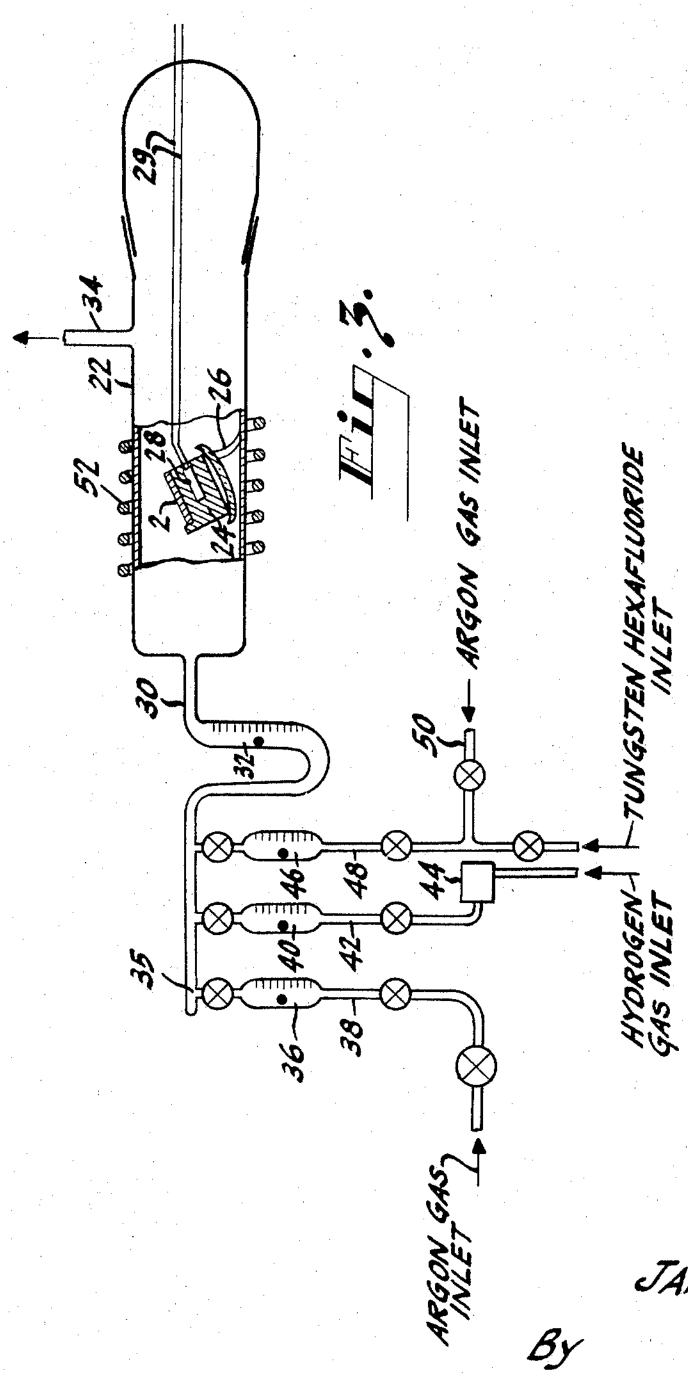

Next, hydrogen is admitted into the system through the inlet tube 42 and the flow meter 40, and is permitted to flow through the furnace tube 22 at a rate of about 2000 cc. per minute. When the hydrogen flow has been established for a time, tungsten hexafluoride at a rate of about 30 cc. per minute is again admitted to the gaseous stream through inlet tube 48 and flow meter 46. The heating temperature of the assembly is the same as mentioned previously. Under these conditions, as shown in FIGURE 5, the hydrogen reduces the tungsten hexafluoride and deposits tungsten on all of the heated surfaces. Thus, a layer of tungsten 56 is deposited on the entire surface of the silicon dioxide layer 12, as well as on top of the previously-deposited thin layers of tungsten 54. In making a microcircuit, a layer of tungsten about 1 micron thick is permitted to deposit. At the conclusion of the tungsten deposition process, argon is admitted through the branch line 50 to purge the apparatus of the corrosive tungsten hexafluoride to prevent attack of the apparatus walls.

In order to remove unwanted tungsten from the layer 56 and leave only the desired pattern of interconnections, excess tungsten can be removed with any suitable masking and etching technique.

Although the method has been illustrated with an example in which tungsten is the deposited metal, molybdenum can be similarly deposited from molybdenum hexafluoride.

What is claimed is:

1. A process comprising heating in an enclosed chamber a surface of a layer comprising silicon dioxide to a temperature of about 500° C. to 800° C., treating said heated surface with a vaporized substance selected from the group consisting of tungsten hexafluoride and molybdenum hexafluoride for a brief period of time to increase the adherence of said surface to a tungsten or molybdenum layer to be subsequently deposited thereon, purging all the unreacted hexafluoride from the chamber and then depositing tungsten or molybdenum by mixing hydrogen with some newly vaporized hexafluoride adjacent said heated surface to thereby reduce said hexafluoride and deposit some of the metal constituent thereof on said heated surface.

2. A process according to claim 1 in which said substance is tungsten hexafluoride.

3. A process comprising providing a surface of a silicon body with a coating of silicon dioxide having openings wherein said surface is exposed, heating said body and said coating in an enclosed chamber to a temperature of about 500° C. to 800° C. while bringing tungsten or molybdenum hexafluoride vapor into contact with said exposed silicon surface and with the surface of said oxide layer to deposit tungsten of molybdenum on said exposed silicon surface and to increase the adherence of said oxide surface for tungsten or molybdenum which is to be deposited later thereon, purging all the unreacted hexafluoride from the chamber and then depositing tungsten or molybdenum on said oxide surface by mixing hydrogen with some newly vaporized hexafluoride adjacent said oxide surface to thereby reduce said hexafluoride and deposit some of the metal constituent thereof on said oxide surface.

4. A process according to claim 3 in which tungsten is deposited.

References Cited

UNITED STATES PATENTS

| | | | |
|---|---|---|---|
| 3,399,331 | 8/1968 | Mutter et al. | |
| 3,375,418 | 3/1968 | Garnache et al. | 117—212 X |
| 3,364,087 | 1/1968 | Solomon et al. | 117—107.2 X |
| 3,333,984 | 8/1967 | Kaspaul et al. | 117—213 |
| 3,325,258 | 6/1967 | Fottler et al. | 107—107 X |
| 3,290,570 | 12/1966 | Cunningham et al. | 117—217 X |
| 3,232,803 | 1/1966 | Barnett et al. | 156—17 X |
| 3,160,798 | 12/1964 | Lootens et al. | |
| 3,147,412 | 9/1964 | Hill. | |

OTHER REFERENCES

Powell, Oxley and Blocker: "Vapor Deposition," John Wiley & Sons, New York, May 10, 1966, pp. 302–305, 322–326, 335–36, 339–40.

ALFRED L. LEAVITT, Primary Examiner

ALAN GRIMALDI, Assistant Examiner

U.S. Cl. X.R.

29—590; 117–54, 107.2, 213, 217; 156—17; 317—234